INVENTORS
RUDOLF F. KLAVER
KENNETH W. GARDINER

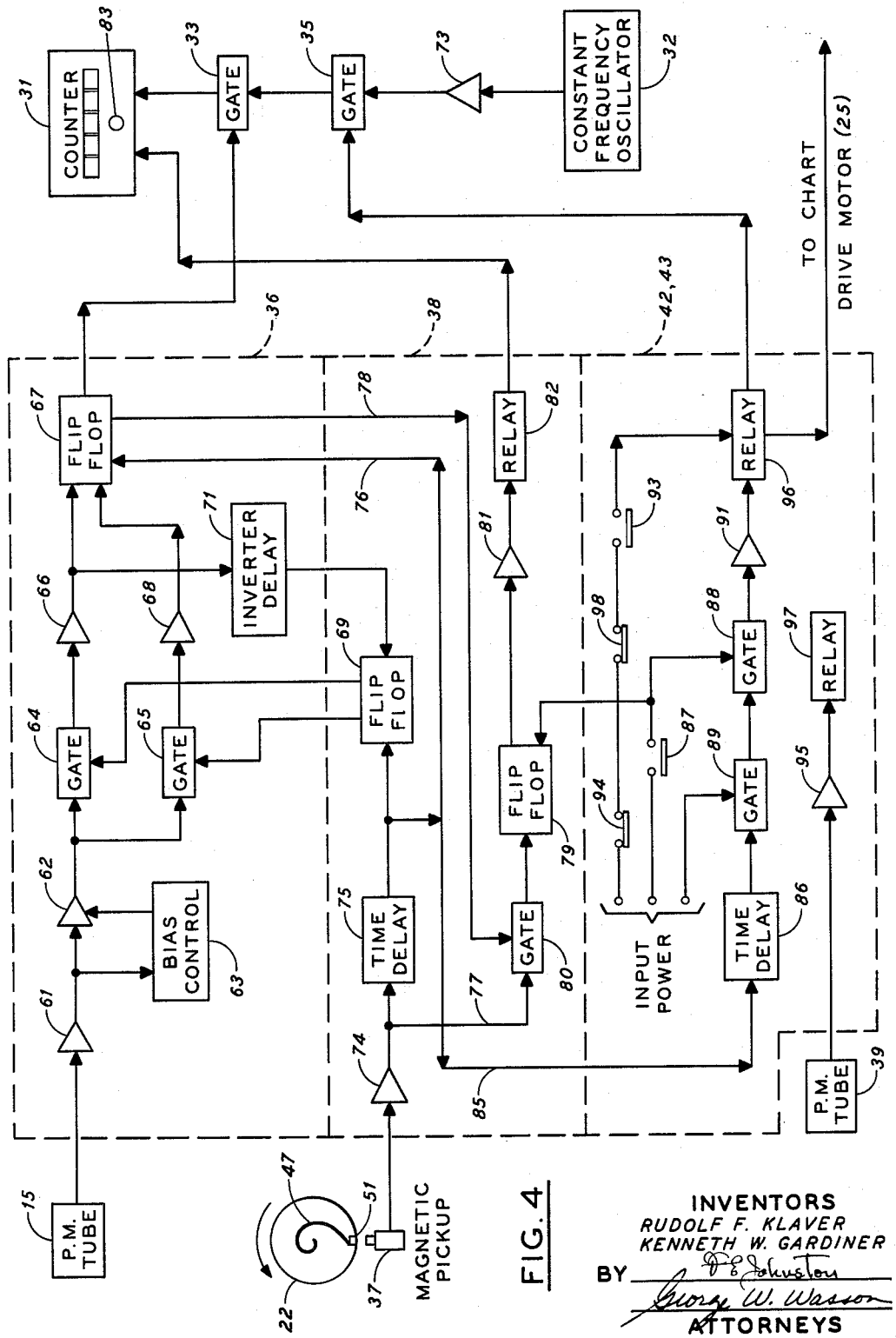

United States Patent Office 3,259,733
Patented July 5, 1966

3,259,733
AUTOMATIC INTEGRATOR FOR
CHROMATOGRAPH RECORDS
Rudolf F. Klaver, Albany, and Kenneth W. Gardiner,
Menlo Park, Calif., assignors to Chevron Research
Company, a corporation of Delaware
Filed Feb. 24, 1961, Ser. No. 91,519
3 Claims. (Cl. 235—61.6)

This invention relates to an apparatus for automatically determining the area enclosed between line indications on selectable portions of a record chart by the process of integration and, more particularly, to an apparatus for optically scanning partial areas and for summing representations of the partial areas over preselected portions of a record as a determination of an enclosed record area.

In certain analysis procedures it is customary to determine the presence and quantity content of certain particular elements or compounds within a sample being analyzed. One such procedure for analyzing a sample employs a chromatograph where a sample is separated into its constituent compounds and an indication of the quantity of each constituent compound is recorded as an analysis of the sample. The usual record produced by a chromatograph constitutes a series of peaks along a waving line produced on a chart strip wherein the individual peaks represent both the presence and the quantity of different elements or sub-compounds within the original sample. This waving line record has been employed to indicate the presence of the constituent elements or compounds by merely noting the existence of the peaks along the record. However, when it is desired to determine a reasonably accurate indication of the quantity of a selected element or subcompound within the sample, it becomes necessary to determine the area actually enclosed along the record between the build-up and drop-off of a recorded peak. The very nature of the chromatograph is that it will not produce a narrow line indication of the presence of a particular constituent in that the presence of a constituent will be displayed on the record as a build-up toward an actual peak and a drop-off from that peak as the analysis continues to the next compound. In some chromatograph analyses, the build-up and drop-off may be due to extremely slight molecular differences between compounds falling within a group desired in the analysis, each group including compounds close enough in similarity to the actually desired compound to be recorded therewith. An accurate analysis of such a record should provide for the determination of the area enclosed by the entire peak being analyzed including both the build-up and drop-off areas.

In very simple analysis procedures where a peak is indicated by a gradual build-up and decline and wherein the peak has no subpeaks therewithin, the determination of the area enclosed by the peak may be simply performed by relating the peak amplitude to a scale indicating quantity so that the machine may be read directly in a percentage weight quantity after an initial calibration. Another procedure for determining the area enclosed by a peak where the peaks are of uniform character is to consider the peak as a triangle and to approximate its area by measuring the base line enclosed by the peak and the height of the peak itself and employing these figures to determine an area in the well-known triangle area calculation method. Both of these procedures may be performed by automatic apparatus driven directly from the chromatograph recorder and may provide a reasonably accurate indication of the area enclosed by an analysis peak if the peak being analyzed is a relatively smooth indication of the presence of an element or sub-combination. On the other hand, where the peak is complex or where the amplification factor employed in the chromatograph may be varied to accommodate both small and large indications of elements present, these simple procedures are no longer applicable. Furthermore, where, through instrument drift or voltage variations, the base line of a chromatograph record becomes a variable or curving line, the linear measurement of peak height and the area determination by height and base measurements are no longer applicable or accurate in the analysis of the record.

The apparatus of the present invention has been devised to solve the problem of record trace integration where complex traces are encountered and where scale factors or attenuation factors may be automatically or physically varied in the chromatograph recorder. In accordance with the present invention, the peaks of a chromatograph record are separated into individual incremental portions. Each individual portion is separately calculated and then accumulated with all other measurements of parallel portions of the peak to provide a total indication of the area enclosed by all of the incremental areas. The individual area measurements are accomplished by optically scanning across the record while the record is moved relatively slowly longitudinally or relative to a scanning apparatus and by initiating and terminating a counting apparatus with the sensing of the base line and curving line of the chromatograph record. The present apparatus also provides for the automatic termination of a peak integration upon the arrival at a preselected position along a record where the record peak indication being integrated terminates. Since the area is determined by the accumulation of incremental portions and the individual incremental portions are measurements between a base line and the curving line of the chromatograph record, any variation in the base line will only affect individual incremental measurements and the record may therefore be fully and accurately analyzed regardless of base line shift. Furthermore, variations in the amplification or attenuation factor of the chromatograph recorder may be noted with the record trace and may be employed along with the accumulations produced by the scanning system as a factor in determining the area enclosed by an integrated peak.

The object of the present invention is an automatic apparatus for producing incremental area information by an optical scanning procedure and for accumulating the incremental area information derived from a plurality of optical scans to produce an indication of area enclosed between a base line and a curving line of a printed record trace.

A further object of the present invention is an apparatus for accumulating incremental portions of information derived from a plurality of parallel scans of the area enclosed within preselected portions of a record chart and between a pair of line indications on the record chart.

Another object of the present invention is an optical scanning system for deriving increments of information indicative of the area enclosed between a pair of spaced lines on a printed chart.

Further objects and features of the invention will be readily apparent to those skilled in the art from the specification and appended drawings illustrating a certain preferred embodiment in which:

FIG. 4 is a block diagram illustration of the electronic circuit employed for the accumulation of information in the apparatus of the present invention.

Figure 1:
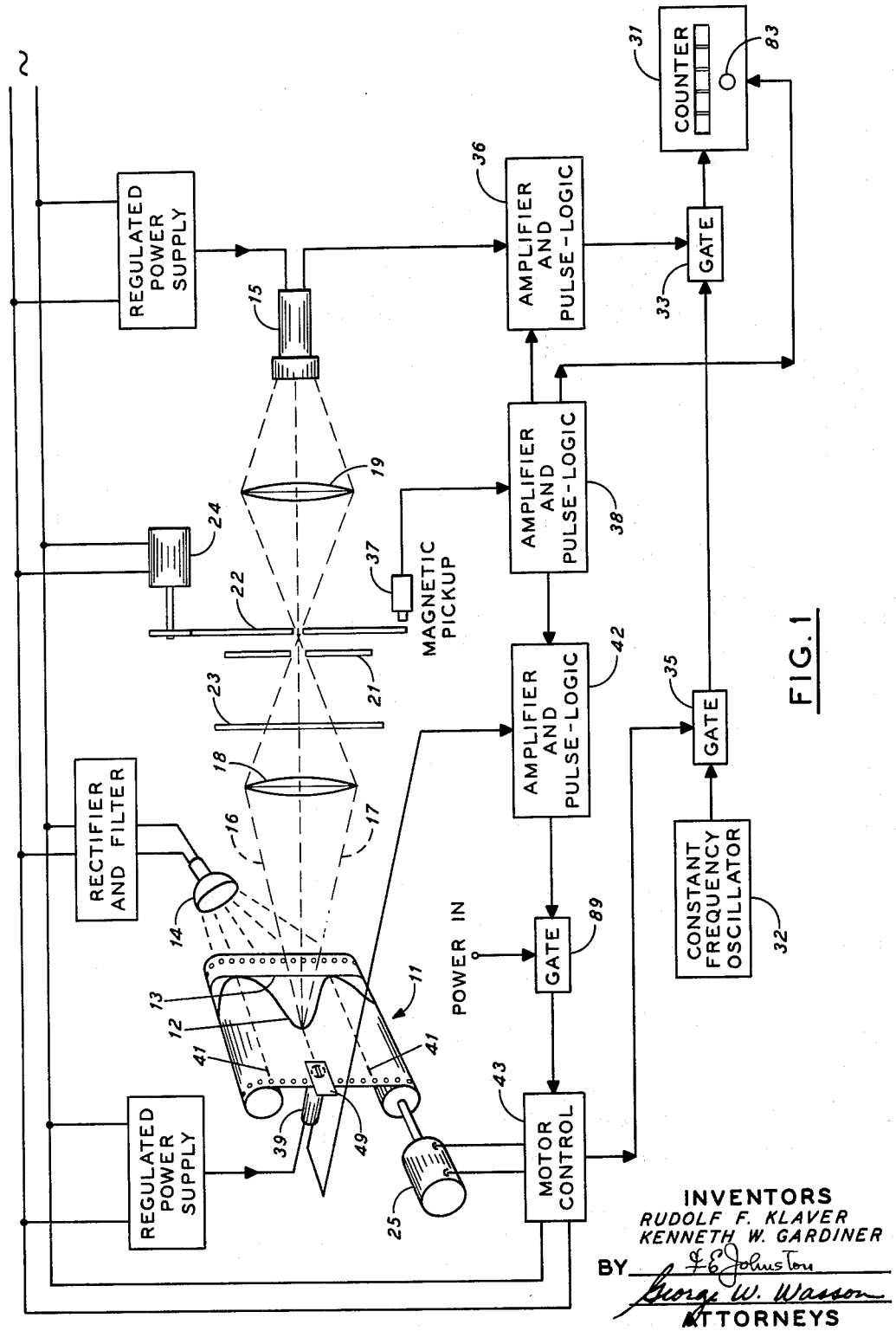
FIG. 1 is a schematic illustration partially in block diagram form of the optical scanning, information accumulation, and mechanical drive systems of the present invention.

An integrator and the process of integration as described in the present invention constitutes the separation of a variable quantity into a plurality of integral portions, the determination of a representation of the individual incremental portions and the accumulation of a plurality of these incremental portions into an indication of the whole of the original variable quantity. Specifically the integration process is used herein to determine the area enclosed between a base line and a curving line indicating a varying quantity on a record chart. The integration process employs an optical scanning system with associated photosensitive devices for sensing the reflection of energy from the light source as projected onto a record displaying the varying quantity. As shown in FIG. 1, the record chart 11 includes a curve line 12 and a base line 13. The area to be integrated is between the two lines. The record chart is positioned with respect to a displaced source of radiant energy here shown as a lamp 14. A photosensitive device 15, such as a photomultiplier tube, is positioned in an appropriate location so as to respond to energy reflected from the lamp 14 by the chart 11. The reflection path to the tube is illustrated by the dotted lines 16 and 17 representing the optical paths through lenses 18 and 19. In the reflection path and between the chart 11 and the photosensitive tube 15 are a pair of apertured members 21 and 22 positioned substantially at the principal focus of the lens system 18 and 19. An optical filter 23 may also be positioned in the path of optical reflection for controlling the sensitivity of the phototube to the information presented on the chart 11. In the illustration of FIG. 1, the lamp 14, lenses 18 and 19, filter 23, apertured element 21 and photosensitive tube 15 are fixed with respect to each other and the chart 11. The apertured member 22 is schematically illustrated in its position with respect to the previously recited elements of the integrator, however, the apertured member 22 is mounted to rotate about its central axis, not herein shown, and is driven by a synchronous motor 24 so that the aperture of the member 22 is moved within the optical focus path of the phototube 15 and lens system 18 and 19. This rotation of the member 22 causes movement of the optically sensitive path of the apparatus thus far described to accomplish the desired record scanning. The scanning action is more completely illustrated in FIG. 2 of the drawings. Motor 25 produces relative movement between the optical sensitive system and the chart 11.

The mechanical drive system and the optical scanning system are adapted to control the accumulation of information in counter 31 from constant frequency oscillator 32 in accordance with the actuation and control of a plurality of gates 33, 89 and 35. Gate 33 is controlled from the photosensitive device 15 through appropriate amplifying and pulse-logic circuits 36 to open the gate 33 when the optical scanning system is tracing an integral portion of the area enclosed between the curve 12 and the base line 13. The gate 89 is controlled by a magnetically sensitive coupling between a pick-up head 37 and the apertured member 22 through an amplifier and pulse-logic circuit 38 to synchronize the scanning and accumulating portions of the apparatus by opening the gate 89 during each period that the optical system is scanning a record portion of the chart 11. The gate 35 is controlled by gate 89 and the motor control 43. A photosensitive device 39 responds to record stop marks 41 appropriately positioned on the chart 11. The photosensitive device 39 effects a control on motor control 43 for terminating energization to synchronous motor 25 when a preselected part of the chart has been integrated. This action results in a closing of gate 35, by motor control 43.

Figure 2:
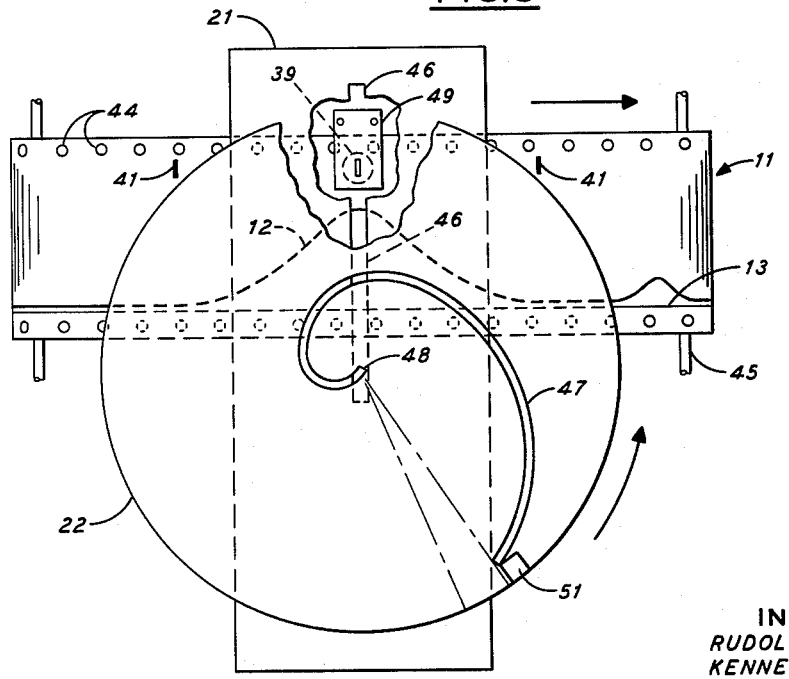
FIG. 2 is a top plan view illustrating the optical scanning system and its relationship to a record trace being scanned.

Illustrated in FIG. 2 are the mechanical relationships for accomplishing the desired optical scanning of the record chart. In this figure the chart 11 with its trace 12, base line 13 and stop marks 41 is illustrated in its position below the apertured members 21 and 22. Also shown on the chart are a plurality of perforations 44 adapted for engagement with suitable pins on a drive wheel attached by shaft 45. Shaft 45 is driven by motor 25 to produce the desired relative movement between the chart 11 and the scanning system.

The apertured member 21 constitutes a flat sheet-like member with an elongated slit cut therethrough. The slit 46 is dimensioned to be long enough in a transverse direction to cover the entire record chart 11 while its short dimension, or width is established to provide the optimum sensitivity and signal-noise ratio for the integration of the chart. The apertured member 46 is stationary and chart 11 is moved relative to the slit 46 upon energization of the motor 25.

The second apertured member 22 is of disk shape and the aperture 47 therethrough displays a spiral shape commencing at the center 48 and spiraling out toward the periphery at a constant rate. The spiral slit 47 is constructed in accordance with the equation $$R = K\theta$$

where R is the distance from the center 48 to positions along the slit 47, K is an arbitrary constant determining the radial and angular portion of the disk to be covered by the slit, and $\theta$ is the angle of rotation of the disk in radians. The speed of rotation of the disk 22 and the constant employed in the determination of the spiral form for the slit 47 determines the rate at which the record chart 11 will be repeatedly scanned.

Also shown in FIG. 2 is the photosensitive device 39 behind chart 11 and apertured member 49. Light energy from the source 14 passing through the member 49 is directed to the photocell 39 except when interrupted by a stop mark 41 on the chart 11. A magnetically sensitized area 51 is represented on the disk 22 in a position with respect to the end of the curved slit 47 to provide for synchronization of the scanning apparatus in a manner to be hereinafter more fully described. It should be noted that the curved slit 47 does not extend entirely to the periphery of the disk 22 and that the constants chosen for the construction of the curve are such that the curve terminates before a complete revolution of the disk is accomplished. The optical path through the apertured members 21 and 22 is thus completely interrupted for at least a short portion of time in each record scan. It should be understood that the relative dimensions as shown in FIG. 2 are merely illustrative in that the apertured members 21 and 22 may be much smaller than illustrated and may be positioned within the optical path of the scanner where the image of the record chart are much smaller.

The apertured members 21 and 22 are constructed of opaque material except where the slits 46 and 47 have been etched or cut therein so that with both apertured members in the optical path for reflections of the light 14 to the photosensitive tube 15 from the chart 11, the only open optical path to the phototube will be provided where the elongated slit 46 and the spiral slit 47 overlap. It can be seen that the overlapping position of these two apertures will be continuously moved from the center 48 of the disk 22 toward the periphery of the disk as the disk is rotated (in the direction shown). The chart 11 is thus effectively optically scanned by the photosensitive device 15. It should be understood that additional masking means may be provided to direct the optical sensitivity of the photosensitive device 15 to the chart 11.

Figure 3:
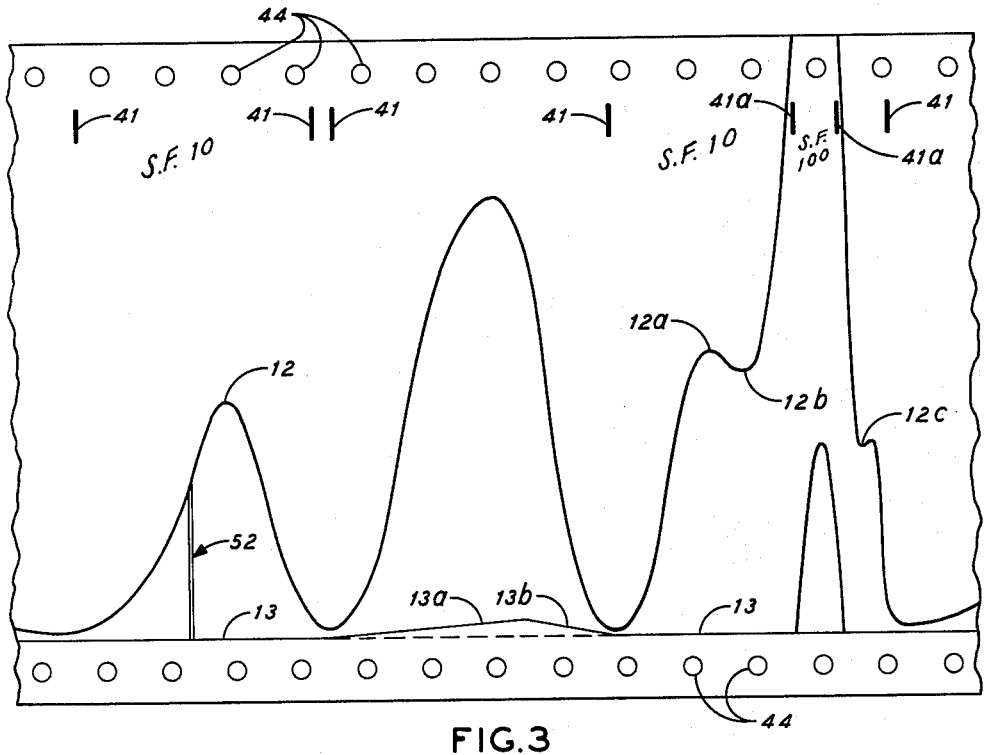
FIG. 3 is an illustration of part of a record to be integrated by the apparatus of the present invention.

Referring now to FIG. 3 illustrating a portion of a record chart that may be integrated by the automatic apparatus of the present invention, it may be seen that the effective optical scanning of the area enclosed between the curved line 12 and the base line 13 will follow a plurality of parallel narrow strips. One such strip is shown at 52. With each separate scan of the chart, a representation of the area between lines on the record may be derived from signals produced by the phototube 15 as it responds to interruptions in the reflection of light as a record lien is scanned. In this manner the total area enclosed between the curved line 12 and the base line 13 may be determined by an accumulation of the plurality of area representations to provide a reasonably accurate indication of the total area enclosed by the curve within a preselected area of the chart.

The optical scanning system as illustrated in FIGS. 1 and 2 is employed to energize and control logic circuits 36, 38 and 42 for interpretation of the information derived from the optical scanning of the record 11. The logic circuits are schematically illustrated in FIG. 4. The purpose of these circuits is to energize the counter 31 from constant frequency source 32 at the beginning of each incremental area, as for instance the area displayed in FIG. 3 at 52, and to interrupt the energization after the optical scanning system has passed the curved line 12. The counting process will be initiated each time the optical scanning system passes the base line 13 and terminated when a second line is sensed. As previously described, the rotation of the apertured member 22 with respect to the stationary apertured member 21 and the slowly moving chart 11 directs the optical sensitivity path across the record to encounter marks or lines on the chart 11.

The signals from the photosensitive device 15 are passed through an amplifier 61 and to a second amplifier 62 having an additional input from a bias control 63. The bias control 63 is adjustable to provide a reference voltage to the amplifier 62 proportioned to the input average voltage from the photosensitive device 15 and to control the passage of signals through amplifier 62. In normal operation of a device as illustrated herein, an average input voltage from the photosensitive device 15 with full reflection of light from the source 14 may produce a voltage of approximately four volts at the output of amplifier 61. When the photosensitive device scans a line on the chart 11 the voltage produced by the photosensitive device 15 may drop to approximately two volts. If the bias control 63 is adjusted to provide a normal bias input to the amplifier 62 of three volts, that three-volt input may be enough to maintain the amplifier 62 in a cut-off condition. However, when a two-volt signal is supplied as a line is scanned, the input of two volts from the photosensitive device 15 will be below the three-volt bias on amplifier 62 and will produce a pulse at the output of amplifier 62.

The output from the amplifier 62 is fed to a pair of gates 64 anad 65. Gate 64 passes its signals through an amplifier 66 to a flip-flop 67 while signals through gate 65 are supplied to amplifier 68 and flip-flop 67. The flip-flop 67 operates as a switch to open with a pulse from gate 64 and close with a pulse from gate 65. The gates 64 and 65 are initially set in accordance with the condition of a flip-flop 69 to place gate 64 in an open condition and gate 65 in a closed condition. When a pulse is applied to the gate 64 a signal is passed to amplifier 66 and to an inverter delay circuit 71. The delay circuit 71 delays the signal by its pulse width and inverts it in phase to reverse the condition of the flip-flop 69. Reversal of flip-flop 69 switches gate 64 to a closed condition and gate 65 to an open condition. The operation of inverted delay circuit 71 provides a short delay period between input signal and output action signal to allow a short period of response time to the circuits controlled by it without automatically terminating their operation at the first instant of an input signal. It may now be seen that as the photosensitive device 15 recognizes the base line 13 a signal is produced that will be passed through amplifier 62 to gate 64 and to both flip-flops 67 and 69. As the scanning system and photosensitive device 15 senses the curved line 12, a pulse will be passed through the gate 65 to the flip-flop 67 to switch that circuit back to its original condition. The flip-flop 67 thus operates as a circuit means for actuating the counter 31 by providing the control for gate 33 to switch it between open and closed conditions and, in that manner, to control the passage of signals from the constant frequency oscillator 32 through the amplifier 73 to the counter 31.

If, because of a break in the curved line 12 or because the chart 11 has only one line marked thereon, the photosensitive device 15 does not recognize a second line in any single scan, the gate 33 would remain open during the entire sweep and the counter 31 would continue to accumulate signals from the oscllator 32. It is necessary for proper operation of the logic circuits that the flip-flop 67 and gate 33 be provided with a resetting pulse to place the circuits in condition for the next incremental area scan even if no second line is recognized. The reset operation is accomplished by the magnetic pick-up 37 shown in FIG. 1 and its actuator, the magnetized portion 51 on the apertured member 22. Each time the magnetized portion 51 passes the magnetic pick-up head 37 a pulse is supplied to the amplifier 74 to provide an input for the time delay 75 and an output resetting pulse to the flip-flop 69. The magnetized area 51 is positioned just prior to the beginning of the dark period on the apertured member 22 defined by the termination of the slit 57 near the periphery and its beginning again at the center of the disk. The time delay provided by the circuit 75 places the signal from the magnetic pick-up 37 at a time position in each optical scan to occur during the dark period provided by the apertured disk. The keying signal to the flip-flop 67 through conductor 76 returns the multivibrator to an OFF condition thus closing gate 33 if it had not been previously closed by a signal passing through gate 65. The flip-flop 69 also receives a signal from time delay 75 and is keyed to a reset condition by the pulse from the magnetic pick-up to return gate 64 to an open condition and gate 65 to a closed condition so that the next subsequent pulse from the photosensitive device 15 will again pass through gate 64 and eventually key gate 65 to an open condition.

An undelayed signal from the magnetic pick-up 37 is also provided at the output of the amplifier 74 and on conductor 77 to a gate 80. The gate 80 is keyed to open condition by an input signal from the flip-flop 67 on conductor 78 when that multivibrator receives its first pulse from the gate 64 and is keyed to a closed condition when the flip-flop 67 receives its second pulse from the gate 65. In the event that the flip-flop 67 does not receive a signal through gate 65, the 80 will remain open and the signal provided from the magnetic pick-up head 37 may be passed through to a flip-flop circuit 79 to place that circuit in one of its stabilized positions. The flip-flop circuit provides an output through amplifier 81 to a relay 82 for energization of an error indicating lamp 83 at the counter 31. The error lamp 83 will then indicate that an erroneous accumulation has been provided in the counter 31 since the optical scanning system has sensed only one line and its associated logic circuit has not been turned to an OFF condition upon the recognition of the curved line 12 on the chart.

The entire operation of the scanning system and its associated logic circuits are synchronized by the magnet pick-up device 37 through the provision of a signal from time delay 75 on conductor 85 to time delay circuit 86. A start switch is provided at 87 to supply voltage to a gate circuit 88 in the power circuit to the chart drive motor 25. The signal from the time delay circuit 86 provides a keying pulse to the gate 89 for a prescribed period of time. During the keying pulse, gate 89 is opened to permit collector voltage to pass to the gate 88 only when the apertured member 22 is in an appropriate position to provide for a complete sweep of the chart 11. When the start switch 87 is closed and gate 88 is supplied with collector voltage through gate 89, a signal is applied through amplifier 91 to relay 96. Relay 96 is part of motor control 43 and controls energization to the chart drive motor 25. Relay 96 remains locked in through manual stop switch 94, normally closed contact 98 on relay 97 and normally open contact 93 on relay 96.

The photosensitive device 39 behind the chart 11 receives light only through aperture 49 and provides a signal through amplifier 95 to relay 97. When the stop marks 41 are aligned with the aperture 49, the light to the photosensitive device 39 is interrupted and relay 97 temporarily opens contact 98. This causes relay 96 to drop out to terminate energization to the chart drive motor 25. Relay 96 also transmits a signal to gate 35 in the recorder circuit to open the circuit between oscillator 32 and counter 31.

It should be noted that the start switch 87 also provides an energization to the flip-flop circuit 79 to return that circuit to its original stabilized position. Once the error light has been energized, it receives continuous energization until the start switch 87 has been depressed. An observation of the information accumulated in the counter 31 should now be accompanied with a recognition that an error has occurred in the just completed accumulation. If an error is indicated, it may be desirable to visually review the chart 11 to detect a break in the base line or the curving line of the chart. If a break is detected and if a new accumulation is desired, the break may be filled and the entire area may be integrated again by returning the chart to its former starting position.

It may now be seen from the description of the logic circuit of the present invention that the automatic integrator will recognize a base line and a curve line on a chart as the chart is optically scanned and will actuate a recorder during the period that the optical scanning system is directed to the area between the base line and the curved line. Any marks observed after a scan has passed the curved line will not affect the operation of the counter since recognition of a curved line will return the flip-flop 67 to its OFF condition and will close the gate 33 to interrupt accumulation within the counter 31. After the apertured member 22 has completed a revolution and a pulse has been provided by the magnetic pick-up head 37, the entire logic circuit will be returned to a condition for the recognition of additional base line and curve line signals.

One advantage of the apparatus of the present invention is the provision of an integration device that is not dependent upon a straight line base line in the determination of an area enclosed by a pair of lines. FIG. 3 illustrates this advantage. As shown in the center peak of FIG. 3, the base line may be inclined as at 13a and 13b rather than straight as illustrated in phantom. The counter 31 will be operated to accumulate an accurate indication of the area enclosed between the base line and the curved line regardless of the variations in position of the base line. Each integral portion accumulated by each separate sweep will be initiated and terminated upon the recognition of base and curve lines respectively on the chart. At the right-hand edge of the portion of FIG. 3 a record is illustrated where the curve has gone off the record and begun again at the base line. The integrator of the present invention will integrate this form of record if additional stop marks 41a are provided where the record goes off the chart 11. The information supplied by the counter 31 must be modified only by the scale factor recorded on the chart strip.

Also shown at right of the chart 11 is another advantage of the record integrator of the present invention. At 12a, 12b and 12c a change in linearity of the curve is shown where knees are illustrated. The present integrator is able to accumulate information derived from separate scans of this chart regardless of directional changes in the recorded signals. The information provided by the counter 31 will, in this case, still indicate the area enclosed between the base line 13 and the chart record indication as displayed by the lines 12, 12a, 12b and 12c. As distinguished from this advantage of the apparatus, the aforementioned former methods of record integration—where a record is considered as a triangle and its area is determined by its altitude and base measurements or where the peak amplitude of the record indication is related to a quantity indication by scale factor—the information produced by previous systems would be in error if a record of the type shown at the right-hand edge of FIG. 3 were to be integrated.

Figure 5:
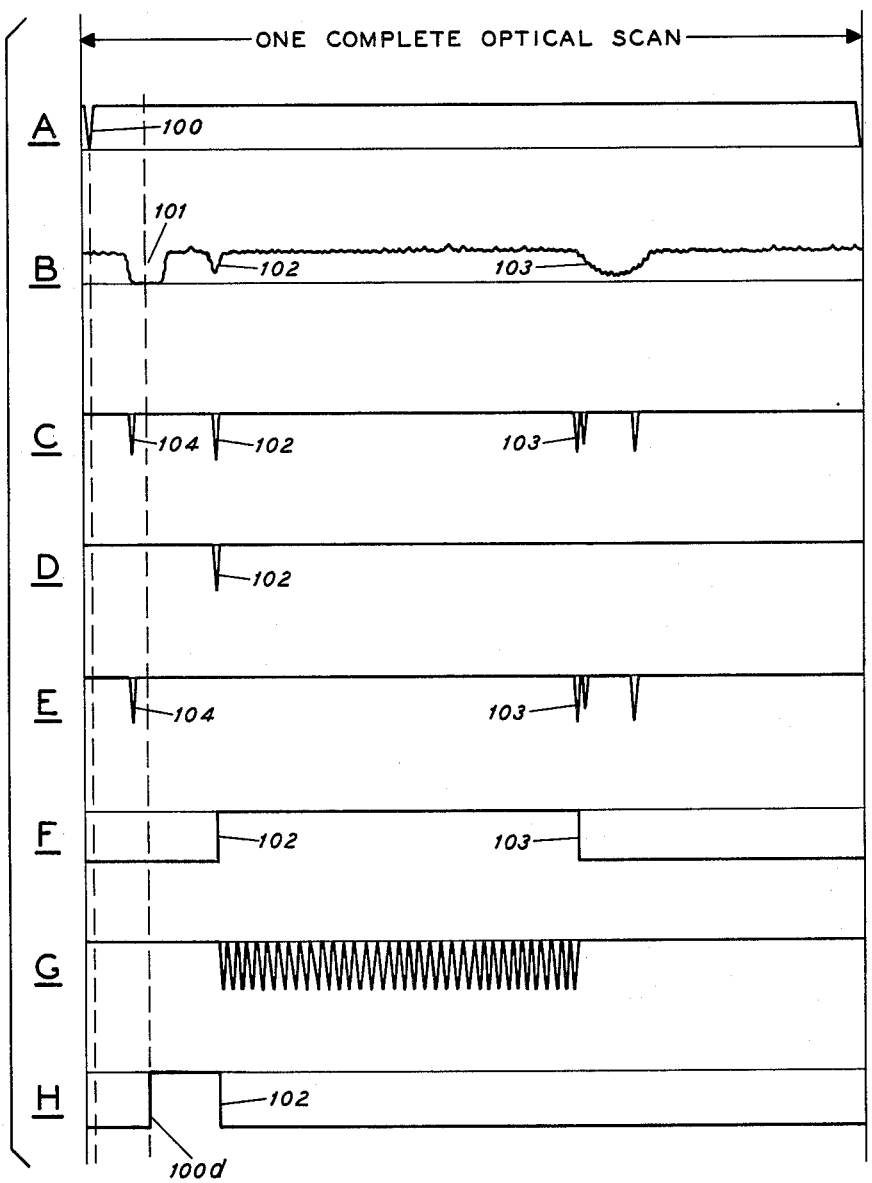
FIG. 5 illustrates representative waveform diagrams of voltages appearing at selected blocks in FIG. 4.

FIG. 5 of the drawings illustrates representative wave forms appearing during a scanning cycle of the record integrator of the present invention. Trace A illustrates the synchronizing pulse derived from the magnetic pick-up device 37. Trace B illustrates the signal produced by the photosensitive device 15 for each revolution of the apertured member 22. Shown on trace B is the dark area at 101, a base line signal at 102 and a curved line signal at 103. Trace C illustrates the output from amplifier 62 indicating the recognition of the initiation of the dark area by pulse 104, the base line pulse at 102 and the curve line pulse at 103. Trace D illustrates the signal passing through gate 64 indicating the response of the gate to only the base line pulse 102. Trace E illustrates the signal that passed through gate 65 indicating the response to the dark line pulse 104 and the curve line pulse 103. Trace F illustrates the signal from the flip-flop 67 both with its initiation at the base line pulse 102 and its termination at the curve line pulse 103. Trace G illustrates the oscillator signal applied to the counter 31 during the period that the flip-flop 67 is actuated. Trace H illustrates the operation of the flip-flop 69 initiated by the edge 100d from the delayed synchronizing pulse of the magnetic pickup 37. This signal opens gate 64 and closes gate 65 while the circuit is reversed by the edge 102 upon the recognition of a base line on the chart.

Each of the circuits described as gate, multi-vibrator, flip-flop, time delay, inverter delay, or motor control and illustrated in FIG. 4 is considered to be a well-known electronic circuit. Each is available or described under the name applied to the blocks in many well-known publications and is operated in a conventional manner to perform its assigned function. Since each of the circuits is well-known, none has been illustrated schematically herein. The collection of these circuits into the logic pattern as illustrated in FIG. 4 is considered to be novel combination of the circuits. While a certain preferred embodiment of the invention has been specifically disclosed it is understood that the invention is not limited thereto as many variations will be apparent to those skilled in the art and the invention is to be given its broadest possible interpretation within the terms of the following claims.

We claim:
1. Apparatus for automatically integrating an area displayed on a chart between a pair of displaced line indications comprising in combination:
  (a) means for separating said area into a plurality of parallel portions,
  (b) a reference signal generating means, a counter means, gating means between said reference signal generating means and said counter means,
  (c) and circuit means actuated by said separating means for gating said gating means to connect said reference signal generating means and counter means,
  (d) said circuit means including means for recognizing said pair of displaced lines within each parallel portion, and means associated with said separating means for synchronizing said actuation of said circuit means in accordance with the separation of said area into parallel portions.

2. Apparatus for automatically integrating a selectable area on a chart enclosed between a base line and a curving line representing variations in a charted quantity comprising in combination:
(a) a chart including said area to be integrated between said base line and said curving line,
(b) an optical scanning mechanism,
(c) means for producing relative motion between said chart and said optical sensing mechanism,
(d) and counting means activated by information derived from said optical scanning mechanism to provide said area integration,
(e) said optical mechanism including a light source, a first photosensitive device for sensing integral quantities of said area, a first aperture between said first photosensitive device and said chart having a dimension parallel to said base line determined by said integrals to be sensed and a length perpendicular to said base line at least as large as the width of said chart, a rotatable disk between said first photosensitive device and said chart, an aperture in said disk having a width substantially equal to the width of said first aperture and a spiral length along said disk beginning at the center thereof and progressing toward the periphery at a predetermined constant rate, said first and spiral apertures cooperating to provide a movable optical path between said chart and said second photosensitive device with rotation of said disk, a first gate operated by said first photosensitive device, magnetic means on said disk, a magnetic sensing means associated with said disk, a second gate operated by said magnetic sensing means, a second photosensitive device for sensing the beginning and end of said selectable area to be integrated, and a third gate controlled by said second photosensitive device,
(f) said counting means including an information source and a counter and having said first and third gates serially interposed between said source and said counter and said second gate operative upon said third gate, whereby said source and said counter are connected upon simultaneous operation of said gates,
(g) and means actuated by said second photosensitive device for terminating operation of said means for producing relative motion at the end of said selected area of said chart.

3. Apparatus for automatically counting signals representative of incremental areas enclosed between a base line and a curving line displaying variations in a charted quantity on a record chart and for accumulating said counted signals for a predetermined portion of said chart having beginning and ending marks comprising:
(a) first sensing means for sensing the beginning and the ending marks of said predetermined portion in sequence,
(b) second sensing means for sensing said base line and said curving line on said record chart in sequence,
(c) a start circuit connected to said second sensing means,
(d) a counter and means for energizing said counter with said signals to be counted,
(e) an actuating circuit means for connecting said counter to said means for energizing,
(f) said start circuit means being responsive to said sensing of said base line for operating said counter actuating circuit, whereby said counter is energized to accumulate said signals,
(g) a stop circuit means connected to said second sensing means,
(h) a circuit switching means, and means in said start circuit means for actuating said circuit switching means so as to disconnect said start circuit from said second sensing means and to connect said stop circuit means to said second sensing means,
(i) said stop circuit means being responsive to said sensing of said curving line for interrupting said connection of said counter to said means for energizing,
(j) said start circuit means, said actuating circuit means for connecting said counter and said stop circuit means being operated in sequence to accumulate said counted signals in incremental areas enclosed between said base line and said curving line beginning with the sensing of said beginning mark of said predetermined portion and terminating with the sensing of said ending mark of said predetermined portion,
(k) and additional circuit means for controlling said circuit switching means to disconnect said stop circuit means from said second sensing means and to reconnect said start circuit means to said second sensing means,
said additional circuit means including a terminating circuit for terminating operation of said counter if said start circuit, said actuating circuit and said stop circuit are not operated in sequence before operation of said additional circuit and means for indicating termination of operation of said counter by said terminating circuit.

References Cited by the Examiner
UNITED STATES PATENTS

| | | | |
|---|---|---|---|
| 2,792,173 | 5/1957 | Schuster | 235—61.6 |
| 2,834,247 | 5/1958 | Pickels | 235—61.6 X |
| 3,168,643 | 2/1965 | Robinson | 235—61.6 |

DARYL W. COOK, *Acting Primary Examiner.*

WALTER W. BURNS, JR., MALCOLM A. MORRISON, *Examiners.*

R. COUNCIL, *Assistant Examiner.*